(12) United States Patent
Howarth et al.

(10) Patent No.: US 10,961,913 B2
(45) Date of Patent: Mar. 30, 2021

(54) ACOUSTIC LINERS FOR USE IN A TURBINE ENGINE

(71) Applicant: MRA SYSTEMS, LLC, Baltimore, MD (US)

(72) Inventors: Graham Frank Howarth, Middletown, DE (US); Andrew Michael Roach, Aberdeen, MD (US); Steven Thomas Davies, Bel Air, MD (US); Richard David Cedar, Montgomery, OH (US); Michael Moses Martinez, Liberty Township, OH (US); Timothy Richard DePuy, Liberty Township, OH (US)

(73) Assignee: MRA SYSTEMS, LLC, Baltimore, MD (US)

( * ) Notice: Subject to any disclaimer, the term of this patent is extended or adjusted under 35 U.S.C. 154(b) by 347 days.

(21) Appl. No.: 15/553,207

(22) PCT Filed: Mar. 10, 2015

(86) PCT No.: PCT/US2015/019681
§ 371 (c)(1),
(2) Date: Aug. 24, 2017

(87) PCT Pub. No.: WO2016/144331
PCT Pub. Date: Sep. 15, 2016

(65) Prior Publication Data
US 2018/0016987 A1  Jan. 18, 2018

(51) Int. Cl.
*F02C 7/24* (2006.01)
*F02C 7/045* (2006.01)
(Continued)

(52) U.S. Cl.
CPC ............ *F02C 7/24* (2013.01); *F02C 7/045* (2013.01); *F02K 1/827* (2013.01); *G10K 11/172* (2013.01);
(Continued)

(58) Field of Classification Search
CPC . F02C 7/24; F02C 7/045; F02K 1/827; G10K 11/172; F05D 2220/323;
(Continued)

(56) References Cited

U.S. PATENT DOCUMENTS 1,918,149 A    7/1933  Sullivan
4,612,737 A    9/1986  Adee et al.
(Continued)

FOREIGN PATENT DOCUMENTS

CN    101149296 A    3/2008
CN    103953449 A    7/2014
(Continued)

OTHER PUBLICATIONS

Machine Translation and First Office Action and Search issued in connection with corresponding CN Application No. 201580077612.3 dated Oct. 31, 2018.
(Continued)

*Primary Examiner* — Forrest M Phillips
(74) *Attorney, Agent, or Firm* — Xsensus LLP

(57) ABSTRACT

An acoustic liner for a turbine engine, the acoustic liner includes a support layer that includes a set of partitioned cavities with open faces, a facing sheet operably coupled to the support layer such that the facing sheet overlies and closes the open faces, a set of perforations located in the facing sheet and in fluid communication with a corresponding one of the cavities to form a set of acoustic resonators, and at least a subset of the perforations have an axially-oriented, relative to the axial flow path, inlet.

19 Claims, 5 Drawing Sheets

(51) Int. Cl.
*G10K 11/172* (2006.01)
*F02K 1/82* (2006.01)

(52) U.S. Cl.
CPC .... *F05D 2220/323* (2013.01); *F05D 2250/11* (2013.01); *F05D 2250/14* (2013.01); *F05D 2250/283* (2013.01); *F05D 2260/963* (2013.01); *Y02T 50/60* (2013.01)

(58) Field of Classification Search
CPC ............ F05D 2250/11; F05D 2250/14; F05D 2250/283; F05D 2260/963; Y02T 50/672
USPC ........................................................ 181/292
See application file for complete search history.

(56) References Cited

U.S. PATENT DOCUMENTS

| | | | |
|---|---|---|---|
| 6,021,612 | A | 2/2000 | Dunn et al. |
| 6,248,423 | B1 | 6/2001 | Clarke et al. |
| 6,609,592 | B2 * | 8/2003 | Wilson ...................... B32B 3/20 181/292 |
| 7,540,354 | B2 * | 6/2009 | Morin ...................... F02C 7/045 181/286 |
| 2002/0036115 | A1 * | 3/2002 | Wilson ...................... B32B 3/20 181/292 |
| 2002/0139900 | A1 | 10/2002 | Porte et al. |
| 2004/0045766 | A1 * | 3/2004 | Porte ........................ F02C 7/045 181/210 |
| 2007/0272483 | A1 * | 11/2007 | Morin ...................... F02K 1/827 181/292 |
| 2010/0044522 | A1 | 2/2010 | Siercke et al. |
| 2011/0044796 | A1 | 2/2011 | Hussain et al. |
| 2014/0003922 | A1 * | 1/2014 | Daniels ................... F01D 25/24 415/182.1 |
| 2014/0166393 | A1 * | 6/2014 | Butler ................. F01N 13/1805 181/228 |
| 2014/0319242 | A1 * | 10/2014 | Meyer ...................... F02K 1/46 239/265.11 |
| 2019/0128296 | A1 * | 5/2019 | Watson ................. F15D 1/0035 |

FOREIGN PATENT DOCUMENTS

| | | |
|---|---|---|
| EP | 0 509 166 B1 | 4/1995 |
| EP | 1 398 473 A1 | 3/2004 |
| EP | 2 253 539 A2 | 11/2010 |
| FR | 2823590 A1 | 10/2002 |
| JP | 07054420 A | 2/1995 |
| JP | H09170494 A2 | 6/1997 |
| JP | H10-331289 A | 12/1998 |
| JP | 2000220231 A | 8/2000 |
| JP | 2007315386 A | 12/2007 |
| WO | 88/06970 A1 | 9/1988 |

OTHER PUBLICATIONS

Japanese Patent Office, Preliminary Rejection re Japanese Patent Application No. 2017-545621, dated Dec. 26, 2018, 3 Pages, Japan.
Japanese Patent Office, Decision of Rejection re Japanese Patent Application No. 2017-545621, dated Jun. 25, 2019, 4 pages, Japan.
International Search Report and Written Opinion issued in connection with corresponding PCT Application No. PCT/US2015/019681 dated Nov. 17, 2015.
International Preliminary Report on Patentability issued in connection with corresponding PCT Application No. PCT/US2015/019681 dated Sep. 21, 2017.
Chinese Office Action dated Feb. 7, 2020 in Chinese Application No. 201580077612.3.
European Communication Pursuant to Article 94(3) dated May 29, 2020 in European Application No. 15712471.0.
European Communication Pursuant to Article 94(3) dated Apr. 14, 2020 in European Application No. 15712471.0.

* cited by examiner

ACOUSTIC LINERS FOR USE IN A TURBINE ENGINE

BACKGROUND OF THE INVENTION

Contemporary aircraft engines can include acoustic attenuation panels in aircraft engine nacelles to reduce noise emissions from aircraft engines. These acoustic attenuation panels generally have a sandwich structure that includes liners enclosing a cellular honeycomb-type inner structure.

BRIEF DESCRIPTION OF THE INVENTION

In one aspect, an embodiment of the invention relates to an acoustic liner for a turbine engine including a support layer that includes a set of partitioned cavities with open faces, a facing sheet operably coupled to the support layer such that the facing sheet overlies and closes the open faces, a set of perforations located in the facing sheet and in fluid communication with a corresponding one of the cavities to form a set of acoustic resonators, and at least a subset of the perforations have an axially-oriented, relative to an axial flow path defined by the turbine engine, inlet having an elongated cross section in the axial flow path direction.

DESCRIPTION OF EMBODIMENTS OF THE INVENTION

Figure 1:
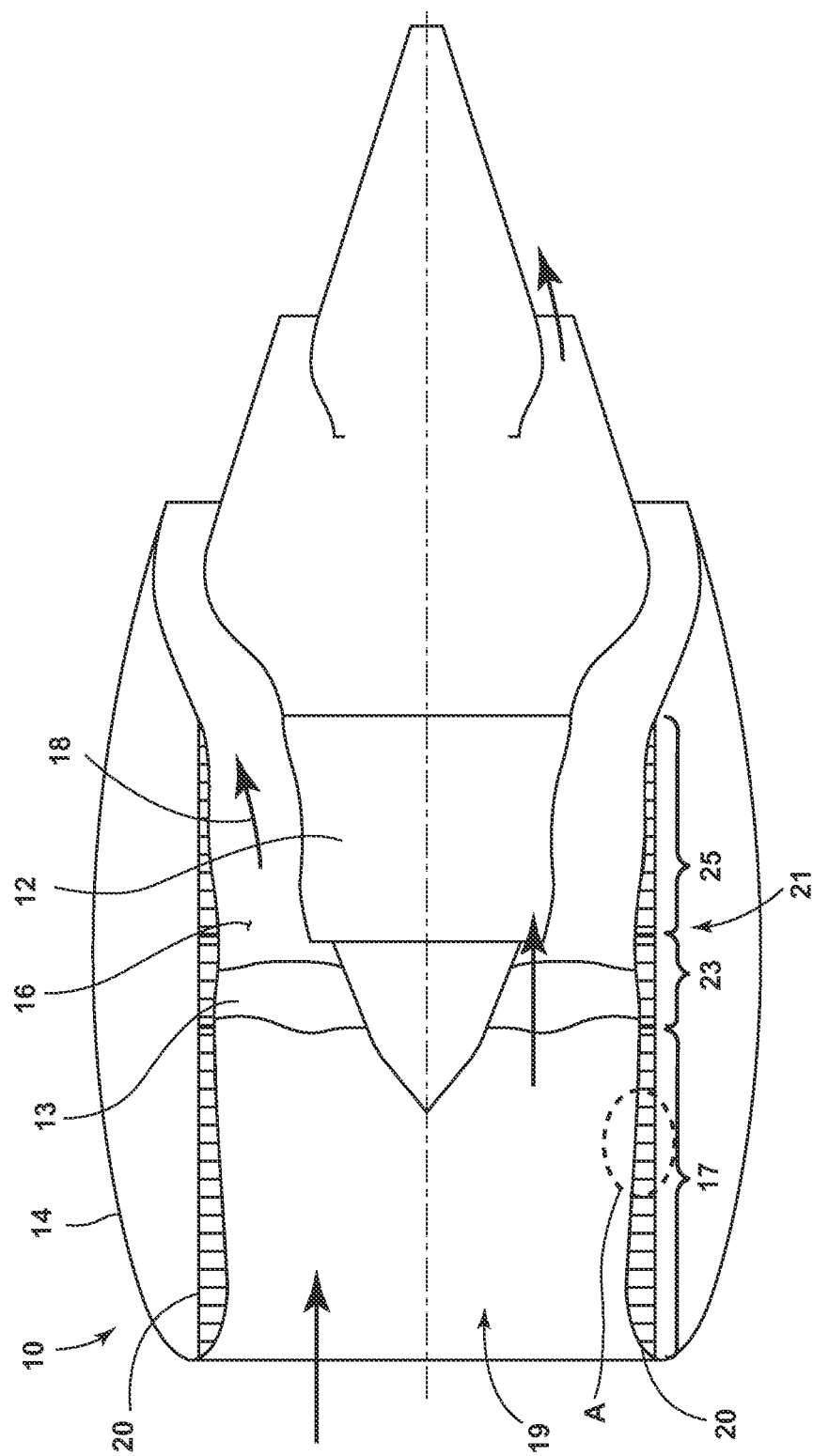
FIG. 1 is a schematic view of an aircraft engine assembly with a portion of the outer nacelle cut away for clarity.

FIG. 1 illustrates an aircraft engine assembly 10 having a turbine engine 12, a fan assembly 13, and a nacelle 14. Portions of the nacelle 14 have been cut away for clarity. The nacelle 14 surrounds the turbine engine 12 and has an inlet section 17 that defines an inlet 19 open to ambient air and an annular airflow path or annular bypass duct 16 through the aircraft engine assembly 10 to define a generally forward-to-aft bypass airflow path as schematically illustrated by the arrow 18. The turbine engine 12 can have a fan section 21 that includes an annular fan case 23 and an aft duct 25 of a thrust reverser (not shown). The fan section can be provided within the nacelle wherein the fan section 21 is in fluid communication with the inlet 19. An annular acoustic panel 20 is provided within the nacelle in at least a portion of the inlet 19 or the fan section 21. The acoustic panel 20 forms a liner for attenuating noise in the aircraft engine assembly 10 and defines the through air flow.

Figure 2:
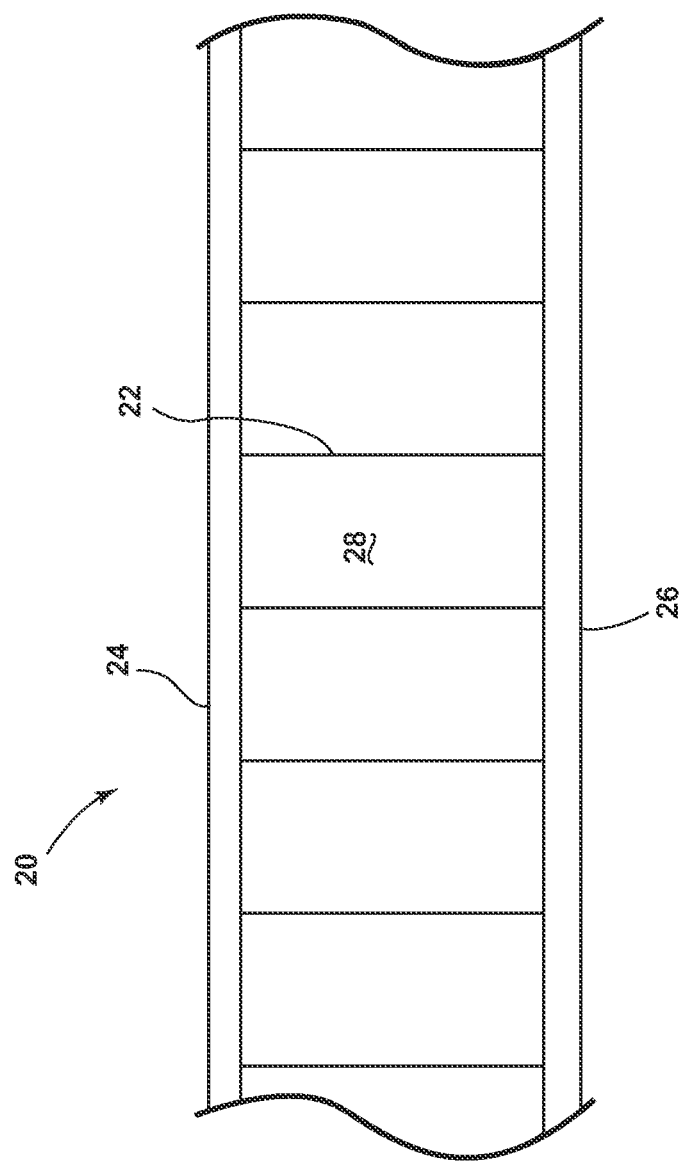
FIG. 2 is a detail view of section A of the acoustic panel of FIG. 1 and illustrating the support layer having a facing sheet and a backing sheet.

FIG. 2 shows a detail view of the annular acoustic panel of FIG. 1. The annular acoustic panel 20 includes an open framework 22 disposed between an imperforate backing sheet 26 and a facing sheet or perforated sheet 24. The open framework 22 forms a support layer having a set of partitioned cavities or cells 28 with open faces. Including that the open framework 22 has open faces on opposing front and rear sides of the open framework 22. In this manner, the open framework 22 forms a set of cells 28 in the open spaces between the open framework 22, the backing sheet 26 and the perforated sheet 24.

Figure 3:
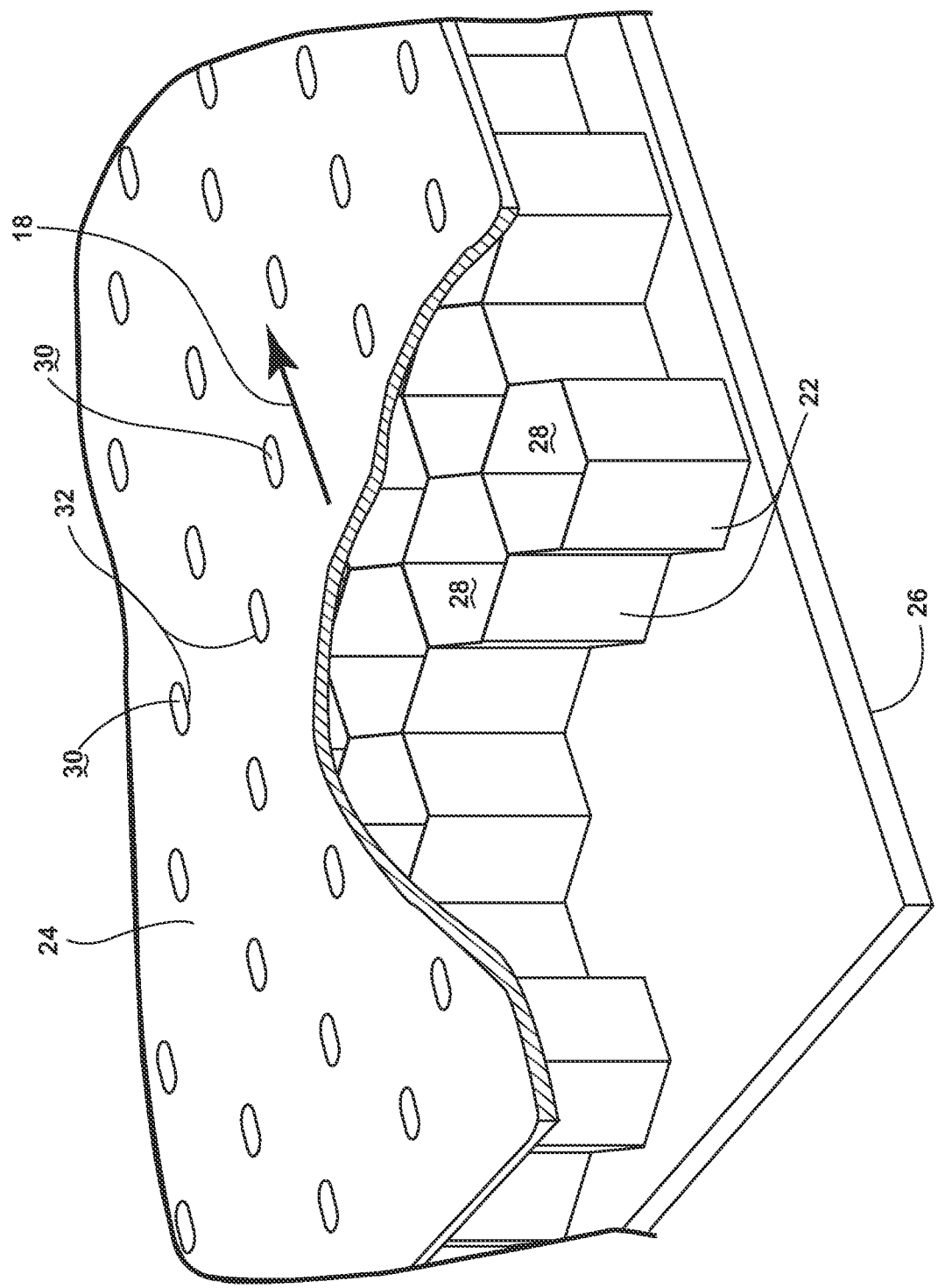
FIG. 3 is perspective view of the acoustic panel of FIG. 1 with portions of the facing sheet and support layer removed for clarity and with perforations formed in the facing sheet according to an embodiment of the invention.

As illustrated more clearly in FIG. 3, the cells 28 formed by the open framework 22 disposed between the backing sheet 26 and the perforated sheet 24 each have a predetermined volume defined by the geometry of the open framework 22 and the spacing between the backing sheet 26 and the perforated sheet 24. The open framework 22 can include a honeycomb structure wherein the cells have six walls formed by the open frame work 22, a top wall formed by the backing sheet 26 and a bottom wall formed by the perforated sheet 24. The backing sheet 26 can be impervious with respect to air. More specifically, the backing sheet can be an imperforate sheet operably coupled to the support layer or open framework 22 on an opposite side of the open framework 22 than the perforated sheet 24. In this manner, the imperforate sheet is on a back side of the open framework 22 and closes off the open faces on the back side.

The perforated sheet 24 can be perforated such that a set of perforations 30, which form inlets, in a predetermined pattern are formed in the perforated sheet 24 to allow air into selected cells 28. The perforated sheet 24 can be operably coupled to the open framework 22 such that the perforations 30 are in overlying relationship with the open faces of the open framework 22 to form paired perforations 30 and cavities that define the acoustic resonator cells 28. The perforated sheet can be directly supported on the open framework 22. Alternatively, an intervening layer can be utilized. The perforated sheet 24 can be formed from any suitable material including, but not limited to, a composite material. The perforations can be identical in area or can vary in area in different zones of the perforated sheet. The backing sheet 26 and perforated sheet 24 and open framework 22 can be formed such that there are no seams present in backing sheet 26 and perforated sheet 24 and open framework 22.

Cells 28 can form a portion of an acoustic resonator. For instance, the area of the perforation 30 and thickness of the perforated sheet 24 can define neck portions of the Helmholtz resonators, and the volume of the cells 28 can define the cavity volume. In addition, the acoustic resonators can be tuned to attenuate engine sounds. For example, the acoustic resonators can be tuned to attenuate predetermined frequencies associated with engine sounds entering the acoustic resonators. The honeycomb cells 28 can be a single layer of hexagonal geometry or multiple layers of the same or different geometry separated by a porous layer, typically identified as a septum. In addition, alternate geometries other than hexagonal can be envisaged including random size cells formed by open cell foams or similar materials.

Figure 4A:
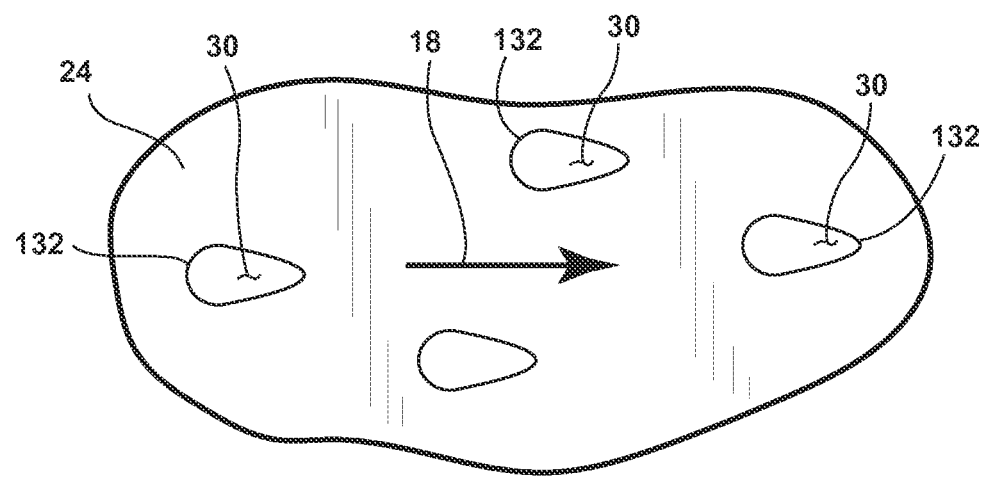
FIG. 4A and FIG. 4B are top views of alternative perforated sheets with inlets formed according to alternative embodiments of the invention.
Figure 4B:
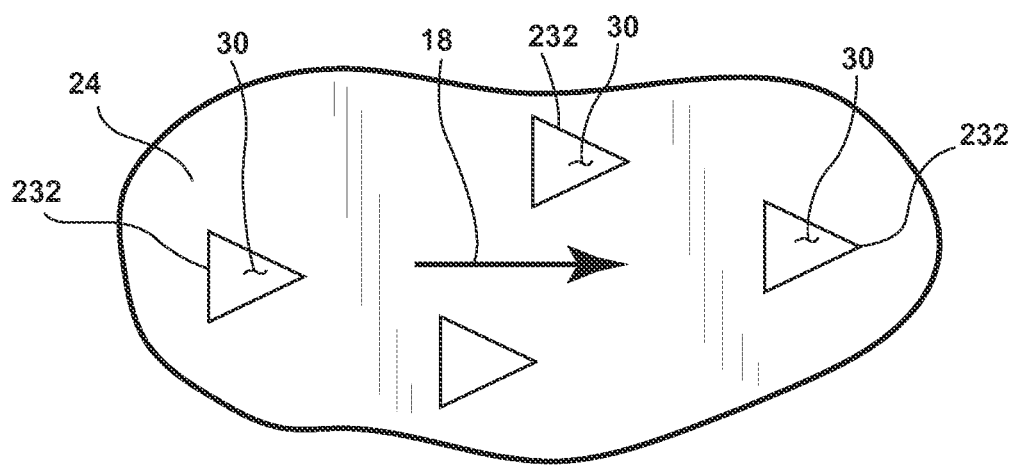

As illustrated in FIG. 3, the perforations 30 have an axially-oriented inlet 32. As used in this description an axially-oriented inlet includes an inlet having an elongated cross section in the axial flow path direction (illustrated by arrow 18). As used herein an axially-oriented inlet can alternatively include any shape, profile, or contour with a frictional drag less than a perforation having a circular inlet of the same cross-sectional area. While all of the perforations 30 have been shown as having an inlet 32 with an elongated cross section it will be understood that any number of the perforations 30 can be shaped in this manner. While the inlets 32 are shaped as ovals, it will be understood that the inlets of the perforations can be shaped in any suitable manner so long as the inlet has an elongated cross section in the axial flow path direction. By way of further non-limiting examples, the shape of the inlets can alternatively include a tapered geometry or teardrop shape 132 (FIG. 4A), a triangular shape 232 (FIG. 4B), etc.

Figure 5A:
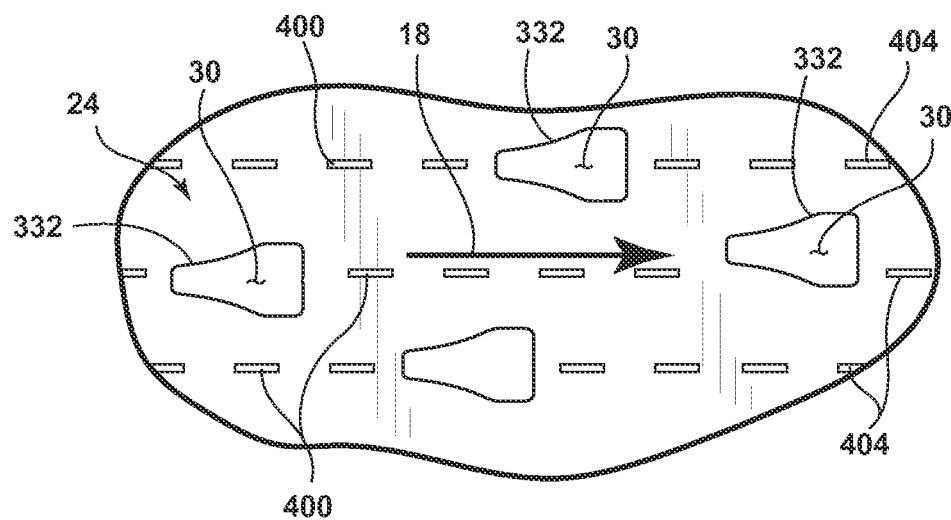
FIG. 5A is a top view of alternative perforated sheet with inlets formed according to an embodiment of the invention.

It will be understood that the cross-sectional shape need not be a geometrical shape and that aerodynamic shapes can be utilized including that the inlet can include a NACA scoop shaped inlet 332 (FIG. 5A). In this manner, it will be understood that any suitable axially-oriented inlet having reduced drag compared to a circular inlet can be utilized.

Figure 5B:
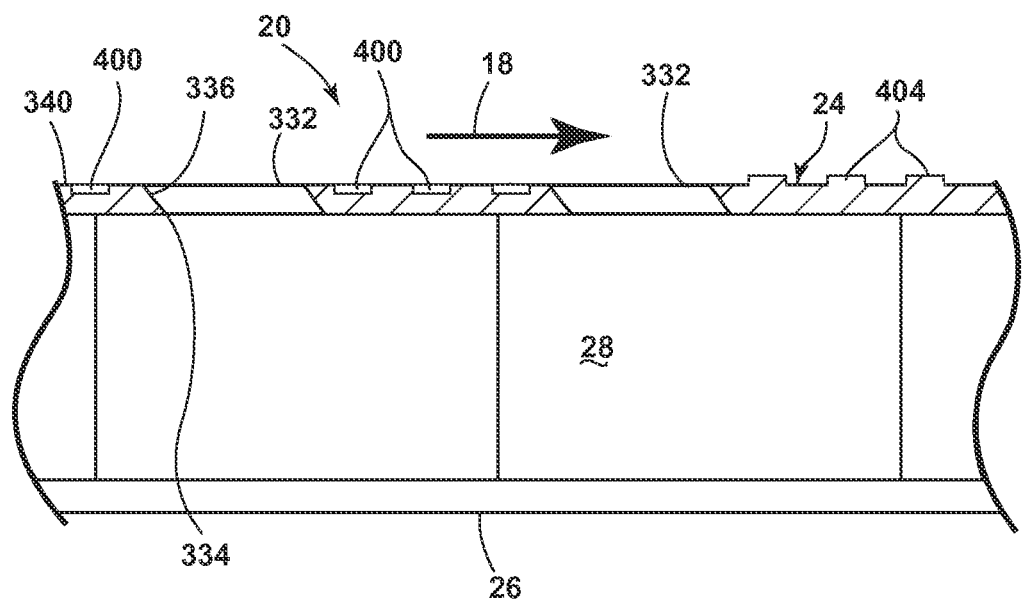
FIG. 5B is a cross-sectional view of the perforated sheet of FIG. 5A

As illustrated in FIG. 5B, the NACA scoop shaped inlet 332 extends from an upper surface 340 of the perforated sheet 24 into a portion of the perforated sheet 24 below the upper surface 340 of the perforated sheet 24. The NACA scoop shaped inlet and other axially elongated perforations can be normal to the surface of the perforated sheet 24 or can incorporate an angled edge or ramp as shown in FIG. 5B to enhance entry of the sound waves into the cells 28 to improve the acoustic characteristics of the panel.

In yet another example, such inlets with minimal drag can be utilized with at least one discontinuity, which can be included in the facing sheet upstream of the inlet. By way of non-limiting example, the at least one discontinuity can include at least one riblet included in the facing sheet. Several riblets 400 have been illustrated as recesses in the upper surface 340 of the perforated sheet 24 while alternatively riblets 404 have been illustrated as protrusions extending from the upper surface 340 of the perforated sheet 24. It is contemplated that the riblet(s) can be shaped in any suitable manner including, but not limited to, that any number of riblets can be included and that the riblet(s) can have any suitable cross-section. Further, the riblets can be continuous riblets or discontinuous riblets that can be interspersed with the perforations. It is contemplated that the riblet(s) can be formed in any suitable manner, including by way of non-limiting example via a grit blasting process. It is contemplated that any number of riblets can be located between the perforations to enhance the continuation of laminar flow and reduce skin friction resulting from circumferential flow of vortices from the perforations.

The embodiments described above provide for a variety of benefits including that the aircraft engine assembly that includes the acoustic liner can provide improved aerodynamic performance versus conventional acoustic panels. The above-described embodiments with the axially oriented perforations provide for reduced skin friction and resultant reduced drag as compared to conventional or micro perforated round perforations. Such improved aerodynamic performance can result in improved engine fuel consumption and still provide the benefits of acoustic attenuation. Further, the above-described embodiments can have reduced manufacturing complexity and cost versus micro perforated liners (perforation size range 0.005 to 0.008 diameter) or linear liners (0.040 diameter and above where the sheet is combined with wire or fabric mesh to create what is identified in the industry as a linear liner).

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An acoustic liner, comprising:
a support layer that includes a set of partitioned cavities with open faces;
a facing sheet having a first surface that is directly supported on the support layer such that the facing sheet overlies and closes the open faces;
a set of perforations included in the facing sheet, and in fluid communication with cavities included in the set of cavities to form a set of acoustic resonators, wherein the acoustic liner is utilized in a turbine engine defining a through air flow having an axial flow path and at least a subset of the set of perforations have an axially-oriented inlet relative to the axial flow path, and each of the perforations in the set of perforations extends completely through the facing sheet from the first surface to a second surface of the facing sheet that faces away from the support layer; and
at least one discontinuity in the facing sheet upstream of the axially-oriented inlet.

2. The acoustic liner of claim 1, wherein a perforation in the set of perforations includes an angled edge that is not normal to the first surface of the facing sheet.

3. The acoustic liner of claim 1 wherein the axially-oriented inlet has an elongated cross section in the axial flow path direction.

4. The acoustic liner of claim 3 wherein a shape of the axially-oriented inlet includes a teardrop.

5. The acoustic liner of claim 1 wherein the axially-oriented inlet includes a NACA scoop shaped inlet.

6. The acoustic liner of claim 1 wherein the at least a subset of the set of perforations includes an outlet in fluid communication with the corresponding one of the cavities and a conduit extending between the axially-oriented inlet and the outlet.

7. The acoustic liner of claim 6 wherein the axially-oriented inlet and the conduit have the same cross section.

8. The acoustic liner of claim 6 wherein the axially-oriented inlet extends from an upper surface of the facing sheet into a portion below the upper surface of the facing sheet.

9. The acoustic liner of claim 1 wherein the at least one discontinuity includes at least one riblet.

10. The acoustic liner of claim 9 wherein the at least one riblet includes a recess in the second surface of the facing sheet that extends less than completely through the facing sheet from the second surface of the facing sheet to the first surface of the facing sheet.

11. The acoustic liner of claim 1, further comprising an imperforate backing sheet supported on a side of the support layer opposite the facing sheet.

12. An acoustic liner for a turbine engine, comprising:
a support layer that includes a set of partitioned cavities with open faces;
a facing sheet operably coupled to the support layer such that a first surface of the facing sheet directly overlies and closes the open faces;
a set of perforations included in the facing sheet, and in fluid communication with cavities included in the set of cavities to form a set of acoustic resonators, wherein at least a subset of the set of perforations have an axially-oriented inlet, relative to an axial flow path defined by the turbine engine, having an elongated cross section in the axial flow path direction, and each of the perforations in the set of perforations extends completely through the facing sheet from the first surface to a second surface of the facing sheet that faces away from the support layer; and
at least one discontinuity in the facing sheets upstream of the axially-oriented inlet.

13. The acoustic liner of claim 12 wherein a shape of the axially-oriented inlet includes a teardrop.

14. The acoustic liner of claim 13 wherein the at least a subset of the set of perforations includes an outlet in fluid communication with the corresponding one of the cavities of the set of partitioned cavities and a conduit extending between the inlet and the outlet.

15. The acoustic liner of claim 14 wherein the axially-oriented inlet extends from an upper surface of the facing sheet and into a portion of the facing sheet below an upper surface of the facing sheet.

16. The acoustic liner of claim 14 wherein the axially-oriented inlet and the conduit have the same cross section.

17. The acoustic liner of claim 12 wherein the at least one discontinuity includes at least one riblet.

18. An acoustic liner for a turbine engine, the acoustic liner comprising:
a support layer that includes a set of partitioned cavities with open faces;
a facing sheet operably coupled to the support layer such that a first surface of the facing sheet directly overlies and closes the open faces;
a set of perforations located in the facing sheet and in fluid communication with a corresponding one of the cavities of the set of partitioned cavities to form a set of acoustic resonators; and
wherein the turbine engine defines a through air flow having an axial flow path and at least a subset of the set of perforations have an axially-oriented inlet, relative to the axial flow path, having an elongated cross section in the axial flow path direction, with the axially-oriented inlet generating less frictional drag than a circular inlet of the same cross-sectional area, and each of the perforations in the set of perforations extends completely through the facing sheet from the first surface to a second surface of the facing sheet that faces away from the support layer, and
the acoustic liner further comprising at least one discontinuously in the facing sheet upstream of the axially-oriented inlet.

19. The acoustic liner of claim 18 wherein a shape of the axially-oriented inlet includes a teardrop.

\* \* \* \* \*